(12) United States Patent
Aoki et al.

(10) Patent No.: US 8,474,967 B2
(45) Date of Patent: Jul. 2, 2013

(54) INK JET RECORDING PROCESS

(75) Inventors: Katsuko Aoki, Kiso-machi (JP); Hiroshi Mukai, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 207 days.

(21) Appl. No.: 13/072,999

(22) Filed: Mar. 28, 2011

(65) Prior Publication Data

US 2011/0234728 A1   Sep. 29, 2011

(30) Foreign Application Priority Data

Mar. 26, 2010 (JP) ................................ 2010-072435

(51) Int. Cl.
*B41J 2/01* (2006.01)

(52) U.S. Cl.
USPC ............................ 347/102; 347/100; 347/105

(58) Field of Classification Search
USPC ............ 347/100, 101, 102, 105, 95; 346/159, 346/135.1; 106/31.13
See application file for complete search history.

(56) References Cited

U.S. PATENT DOCUMENTS

| | | | |
|---|---|---|---|
| 5,609,671 A | 3/1997 | Nagasawa | |
| 5,928,419 A | 7/1999 | Uemura et al. | |
| 5,976,233 A | 11/1999 | Osumi et al. | |
| 6,123,759 A | 9/2000 | Mise et al. | |
| 6,136,286 A | 10/2000 | Okuyama et al. | |
| 6,432,186 B1 * | 8/2002 | Taniguchi | 106/31.58 |
| 6,464,351 B1 * | 10/2002 | Landry-Coltrain et al. | 347/105 |
| 6,695,443 B2 * | 2/2004 | Arita et al. | 347/100 |
| 6,902,267 B2 * | 6/2005 | Ohya et al. | 347/104 |
| 7,030,174 B2 * | 4/2006 | Yatake | 523/160 |
| 7,144,449 B2 * | 12/2006 | Udagawa et al. | 106/31.15 |
| 7,829,607 B2 | 11/2010 | Ushiku | |
| 2002/0077384 A1 * | 6/2002 | Sano et al. | 523/160 |
| 2005/0151815 A1 * | 7/2005 | Kanai et al. | 347/102 |
| 2005/0172855 A1 * | 8/2005 | Iijima et al. | 106/31.27 |
| 2006/0011097 A1 * | 1/2006 | Tsuji et al. | 106/31.48 |
| 2006/0012657 A1 * | 1/2006 | Nagashima et al. | 347/100 |
| 2008/0028980 A1 * | 2/2008 | Aoki et al. | 106/31.6 |
| 2008/0152825 A1 | 6/2008 | Mukai et al. | |
| 2008/0152828 A1 | 6/2008 | Mukai et al. | |
| 2008/0152877 A1 | 6/2008 | Mukai et al. | |
| 2008/0182083 A1 * | 7/2008 | Oyanagi et al. | 428/195.1 |
| 2009/0192248 A1 * | 7/2009 | Palumbo et al. | 524/186 |
| 2009/0246479 A1 | 10/2009 | Mukai et al. | |
| 2009/0295847 A1 | 12/2009 | Mukai et al. | |
| 2010/0086690 A1 | 4/2010 | Aoki | |
| 2010/0086691 A1 * | 4/2010 | Mukai et al. | 427/256 |
| 2010/0092674 A1 | 4/2010 | Mukai et al. | |
| 2010/0092675 A1 | 4/2010 | Aoki | |
| 2010/0194816 A1 * | 8/2010 | Kanai et al. | 347/16 |
| 2010/0239759 A1 * | 9/2010 | Tojo et al. | 427/256 |
| 2011/0181675 A1 * | 7/2011 | Takemoto | 347/102 |
| 2011/0183125 A1 * | 7/2011 | Aoki et al. | 428/195.1 |

FOREIGN PATENT DOCUMENTS

| | | |
|---|---|---|
| JP | 56-28256 A | 3/1981 |
| JP | 3-56573A A | 3/1991 |
| JP | 3-79678 A | 4/1991 |
| JP | 03160068 A | 7/1991 |
| JP | 4-18462A A | 1/1992 |
| JP | 7-258578 A | 10/1995 |
| JP | 8-3498A A | 1/1996 |
| JP | 8-283596 A | 10/1996 |
| JP | 10-110110 A | 4/1998 |
| JP | 10-110111 A | 4/1998 |
| JP | 10-110114 A | 4/1998 |
| JP | 10-120958 A | 5/1998 |
| JP | 10-195331 A | 7/1998 |
| JP | 10-195360 A | 7/1998 |
| JP | 10-237349 A | 9/1998 |
| JP | 10-330665 A | 12/1998 |
| JP | 2006-272933 A | 10/2006 |
| JP | 2006-281538 A | 10/2006 |
| JP | 2006-281568 A | 10/2006 |
| JP | 2006-281570 A | 10/2006 |
| JP | 2006-282822 A | 10/2006 |
| JP | 2006-282823 A | 10/2006 |
| JP | 2007-262272 A | 10/2007 |
| JP | 2007-291257 A | 11/2007 |
| JP | 2007-297586 A | 11/2007 |
| JP | 2008-155523 A | 7/2008 |
| JP | 2008-155524 A | 7/2008 |
| JP | 2008-260820 A | 10/2008 |
| JP | 2008-303235 A | 12/2008 |
| JP | 2009-113494 A | 5/2009 |
| JP | 2009-114454 A | 5/2009 |
| JP | 2009-242441 A | 10/2009 |
| JP | 2010-6062 A | 1/2010 |
| JP | 2010-90270 A | 4/2010 |
| JP | 2010-90271 A | 4/2010 |
| JP | 2010-94809 A | 4/2010 |
| JP | 2010-94852 A | 4/2010 |

\* cited by examiner

*Primary Examiner* — Stephen Meier
*Assistant Examiner* — Leonard S Liang
(74) *Attorney, Agent, or Firm* — Nutter McClennen & Fish LLP; John J. Penny, Jr.; Lydia G. Olson

(57) ABSTRACT

Recording onto a non-ink-absorbing recording medium is performed using an aqueous ink composition containing a first solvent composed of at least one selected from 2-pyrrolidone, 1,3-dimethyl-imidazolidinone, and N,N'-dimethylpropylene urea, a second solvent composed of at least one selected from 1,2-hexanediol and 1,2-pentanediol, and a third solvent composed of at least one selected from glycol diethers and heating the non-ink-absorbing recording medium at 40 to 60° C.

6 Claims, No Drawings

INK JET RECORDING PROCESS

BACKGROUND

1. Technical Field

The present invention relates to a recording process using an aqueous ink for performing ink jet recording on a recording medium having a non-ink-absorbing recording surface, such as plastics.

2. Related Art

In known methods for recording on non-ink-absorbing recording media, non-aqueous inks containing main components of organic solvents have been widely used. For example, as a non-aqueous ink jet ink for printing high-quality images and characters on a surface of a vinyl chloride-based resin material, such as a polyvinyl chloride sheet, which is widely used as a medium, for example, for outdoor advertisements, inks each containing a pigment excellent in light resistance, a resin component for fixing the pigment to the surface of a vinyl chloride-based resin material, and an organic solvent that can dissolve the resin component are commonly used. These non-aqueous inks are excellent in some aspects, for example, satisfactory water resistance caused by using both a water-insoluble coloring agent and a water-insoluble resin component and prevention of images from bleeding due to quick drying caused by using a highly volatile solvent. However, since an image is formed by volatilization of the solvent on the surface of a recording medium, there are problems of an odor and toxicity of the solvent during drying. Furthermore, influences of organic solvents on the environment have been concerned.

For example, JP-A-2007-291257 discloses an ink jet recording process using an ink jet ink that is a non-aqueous ink jet ink containing a relatively high-safety organic solvent and being thereby excellent in printing suitability to polyvinyl chloride (PVC), a kind of non-absorptive recording medium, emission stability, and safety and not causing a problem of odor. However, the ink contains, as an example, a main solvent of diethylene glycol diethyl ether in not less than 80 mass %, and it is therefore obvious that the safety is significantly low compared to aqueous inks. In addition, influences of the large amount of the volatile solvent on the environment are considerable. Accordingly, there is a demand for a recording process using an aqueous ink in recording on a non-ink-absorbing recording medium, such as a polyvinyl chloride sheet, from the viewpoints of safety and protection of the environment.

Against this problem, for example, JP-A-2008-260820 discloses an aqueous heat fixing ink that is an aqueous ink jet ink, gives a satisfactory high-speed printing image quality not causing defects such as spots on a non-absorptive recording medium, and can be stably used for a long time and discloses a heat fixing ink jet recording process using the ink. The amount of an organic solvent is 10 to 35 mass %, and diethylene glycol diethyl ether is mentioned as an example of the organic solvent. It is described that a combination of a specific organic solvent and a water-soluble resin and heating of the non-absorptive recording medium to 40 to 90° C. inhibit spots from occurring to give satisfactory recording image quality.

On the other hand, polyvinyl chloride causes defects, such as deformation and dimensional change due to expansion and contraction, at a temperature higher than 60° C. However, JP-A-2008-260820 does not mention abrasion resistance in heating printing at a temperature range of 40 to 60° C. in which polyvinyl chloride can be prevented from softening.

Thus, in recording using an aqueous ink on a polyvinyl chloride material, an effective ink jet recording process showing abrasion resistance that is equal to that of a non-aqueous ink has not been established yet.

SUMMARY

An advantage of some aspects of the invention is to provide an ink jet recording process achieving recording on a recording medium having a non-absorptive recording surface, in particular, a recording medium composed of polyvinyl chloride to form an image having high-quality and abrasion resistance due to an excellent quick-drying property and less bleeding of the ink by performing the recording while heating the recording medium at a temperature range of 40 to 60° C. at which polyvinyl chloride can be heated without causing problems.

An advantage of some aspects of the invention is to solve at least a part of the problems described above, and the invention can be realized as the following aspects or application examples.

Application Example 1

An aspect of the ink jet recording process according to the invention includes a first step of heating a recording medium of a polyvinyl chloride film to a temperature range of 40 to 60° C. and discharging droplets of an aqueous ink composition with an ink jet recording apparatus; and a second step of heating the recording medium to a temperature range of 40 to 60° C. to dry the aqueous ink composition discharged on the recording medium, wherein the aqueous ink composition contains water, at least one kind of water-insoluble coloring agent, water-insoluble thermoplastic resin particles, a surfactant, a first solvent composed of at least one selected from 2-pyrrolidone, 1,3-dimethyl-imidazolidinone, and N,N'-dimethylpropylene urea, a second solvent composed of at least one selected from 1,2-hexanediol and 1,2-pentanediol, and a third solvent composed of at least one selected from glycol diethers having a boiling point of 150 to 220° C., wherein the content (W1) of the first solvent in the aqueous ink composition is 4 to 15 mass %, the content (W2) of the second solvent in the aqueous ink composition is 3 to 8 mass %, the total content (W1+W2) of the first solvent and the second solvent is 18 mass % or less, and the content (W3) of the third solvent in the aqueous ink composition is 4 to 20 mass %.

According to the ink jet recording process of Application Example 1, recording being excellent in quick-drying property, reducing bleeding of an image formed on a non-ink-absorbing recording medium, and providing a recorded matter excellent in abrasion resistance can be achieved.

Application Example 2

In the ink jet recording process according to the above-mentioned application example, the glycol diethers of the third solvent are at least one selected from diethylene glycol dimethyl ether, diethylene glycol diethyl ether, diethylene glycol ethyl methyl ether, diethylene glycol butyl methyl ether, and triethylene glycol dimethyl ether.

Application Example 3

In the ink jet recording process according to the above-mentioned application examples, the water-insoluble coloring agent is a pigment and is dispersed in the aqueous ink composition with a water-soluble resin.

Application Example 4

In the ink jet recording process according to the above-mentioned application examples, the water-insoluble thermoplastic resin particles are made of an acrylic resin or a styrene-acrylic acid copolymer resin.

Application Example 5

In the ink jet recording process according to the above-mentioned application examples, the surfactant is a silicon-based surfactant.

Application Example 6

In the ink jet recording process according to the above-mentioned application examples, the heating of the recording medium is performed with a heater or warm air.

DESCRIPTION OF EXEMPLARY EMBODIMENTS

Preferred embodiments of some aspects of the invention will be described below. The embodiments described below are merely examples of the invention. The invention is not limited to the following embodiments and includes various modifications implemented within the scope of the invention.

1. Ink Jet Recording Process

The ink jet recording process according to an embodiment of the invention includes a first step of heating a recording medium of a polyvinyl chloride film, to a temperature range of 40 to 60° C. and discharging droplets of an aqueous ink composition with an ink jet recording apparatus; and a second step of heating the recording medium to a temperature range of 40 to 60° C. to dry the aqueous ink composition discharged on the recording medium. The aqueous ink composition contains water, at least one kind of water-insoluble coloring agent, water-insoluble thermoplastic resin particles, a surfactant, a first solvent composed of at least one selected from 2-pyrrolidone, 1,3-dimethyl-imidazolidinone, and N,N'-dimethylpropylene urea, a second solvent composed of at least one selected from 1,2-hexanediol and 1,2-pentanediol, and a third solvent composed of at least one selected from glycol diethers having a boiling point of 150 to 220° C. The content (W1) of the first solvent in the aqueous ink composition is 4 to 15 mass %, the content (W2) of the second solvent in the aqueous ink composition is 3 to 8 mass %, the total content (W1+W2) of the first solvent and the second solvent is 18 mass % or less, and the content (W3) of the third solvent in the aqueous ink composition is 4 to 20 mass %. In the invention, the term "image" refers to a printed pattern formed by groups of dots and includes text patterns and solid patterns.

1.1. Ink Jet Recording Process

The ink jet recording process according to a first embodiment of the invention includes a first step of heating a recording medium of a polyvinyl chloride film to a temperature range of 40 to 60° C. and discharging droplets of an aqueous ink composition with an ink jet recording apparatus; and a second step of heating the recording medium to a temperature range of 40 to 60° C. to dry the aqueous ink composition discharged on the recording medium.

The ink jet recording apparatus is not particularly limited as long as it can perform recording by discharging ink droplets and letting the droplets adhere onto a recording medium, but preferably has a function of heating a recording medium during printing. Herein, the term "during printing" refers to the period from the time immediately after that an ink jet recording apparatus has discharged ink droplets and let the droplets adhere onto a recording medium until the time when the ink has been dried.

Examples of the function that can heat a recording medium include a print heating function where a recording medium is brought into direct contact with a heat source and is heated, irradiation of a recording medium with infrared rays or microwaves (electromagnetic waves having a maximum wavelength at about 2450 MHz) without direct contact with the recording medium, and a dryer function where warm air is blown. The print heating function and the dryer function may be employed alone or simultaneously. By this function, the drying temperature during printing can be controlled.

Furthermore, ink droplets are discharged by the ink jet recording apparatus, and the recording medium to which the droplets adhered may be dried with a dryer or in a thermostatic chamber that has been set to a predetermined temperature.

The recording process according to an aspect of the invention is suitable for printing on a recording medium made of polyvinyl chloride. Polyvinyl chloride recording media are commercially available as various types of products for outdoor displays, which are required to have weather resistance for a long time, and for application to be attached to objects having curved surfaces. Any of these products can be appropriately selected according to application.

Furthermore, the recording process according to an aspect of the present invention can be applied to non-ink-absorbing or low-ink-absorbing recording media, in addition to the recording media made of polyvinyl chloride. Examples of non-ink-absorbing recording medium include plastic films not having aqueous ink-receiving layers, and base materials, such as paper, provided with plastic coatings or plastic films thereon. Examples of the plastic film herein include those made of polyethylene terephthalate, polystyrene, polyurethane, polyethylene, or polypropylene. Examples of low-ink-absorbing recording medium include printing paper such as art paper, coated paper, and mat paper.

Here, in this specification, the phrase "non-ink-absorbing or low-ink-absorbing recording medium" refers to a "recording medium that absorbs 10 mL/m$^2$ or less water from the initial contact with water until when 30 msec1/2 has elapsed when measured by a Bristow method". The Bristow method is most commonly used as a method for measuring the amount of liquid absorbed in a short period of time, and Japan Technical Association of the Pulp and Paper Industry (JAPAN TAPPI) also employs this method. This test method is described in detail in Standard No. 51 "Paper and Paperboard—Liquid Absorbency Test Method—Bristow Method" in "JAPAN TAPPI Paper and Pulp Test Methods, 2000 Edition".

The ink jet recording process using the ink jet recording apparatus can be performed, for example, as follows: First, droplets of an aqueous ink composition (described later) are discharged onto a recording medium heated to a temperature range of 40 to 60° C. By doing so, an image can be formed on the recording medium. The ink jet discharging may be performed by any known system, and, in particular, a method for discharging droplets with vibration of a piezoelectric element (recording method using an ink jet head that forms ink droplets by mechanical deformation of an electrostrictive element) can perform excellent image recording.

Subsequently, the recording medium is heated to a temperature range of 40 to 60° C. with a print heater or a drier provided to the ink jet recording apparatus to dry the aqueous ink composition (described later) discharged on the recording medium. By this step, water and other components contained in the aqueous ink composition discharged on the recording medium are promptly evaporated and scattered, and a coating is formed by the resin particles (described later) contained in the aqueous ink composition. As a result, on the recording medium, a high-quality image that hardly has unevenness in ink density and bleeding can be quickly formed, and since the dried matter of the ink adheres on the recording medium by forming the coating of the resin particles, the image is fixed.

The temperature range of heating a recording medium is 40° C. or higher and 60° C. or lower. When the heating temperature of a recording medium is 40° C. or higher, evaporation and scattering of the liquid solvent in the aqueous ink composition can be effectively accelerated. However, if the heating temperature of a recording medium is higher than 60° C., for example, deformation may occur in some types of recording media, or any defects, such as shrink of recorded images, may occur when the recording medium has been cooled to room temperature.

The time heating a recording medium is not particularly limited as long as the liquid solvent contained in the aqueous ink composition is evaporated and scattered and a coating of the thermoplastic resin particles is formed, and can be appropriately determined depending on, for example, the solvent, resin particles, and printing speed.

1.2. Aqueous Ink Composition

The aqueous ink composition used in the ink jet recording process according to an embodiment of the invention will be described in detail below.

1.2.1. Solvent

The aqueous ink composition used in the ink jet recording process according to this embodiment contains a first solvent composed of at least one selected from 2-pyrrolidone, 1,3-dimethyl-imidazolidinone, and N,N'-dimethylpropylene urea, a second solvent composed of at least one selected from 1,2-hexanediol and 1,2-pentanediol, and a third solvent composed of at least one selected from glycol diethers having a boiling point of 150 to 220° C.

The first solvent composed of at least one selected from 2-pyrrolidone, 1,3-dimethyl-imidazolidinone, and N,N'-dimethylpropylene urea works as a satisfactory solubilizing agent or softening agent for a thermoplastic water-soluble resin particles described below or for polyvinyl chloride being a base material of the recording medium.

Since the first solvent has a boiling point of 210 to 250° C. and is therefore evaporated lastly in the heating step, it is concentrated in the residual materials of the ink on the recording medium to a high concentration and dissolves the thermoplastic resin particles. The dissolved thermoplastic resin accelerates formation of a coating of the solidified material having a main component of the coloring agent on the recording medium made of polyvinyl chloride to provide an effect for tight adhesion.

In addition, part of the first solvent contained in the aqueous ink composition infiltrates the recording medium, swells the recording medium, or dissolves the recording medium to act for further strengthening the adhesion between the solidified ink and the polyvinyl chloride.

The content (W1) of the first solvent is 4 mass % or more and 15 mass % or less based on the total mass of the aqueous ink composition. The content (W1) of the first solvent is more preferably 6 mass % or more and 15 mass % or less based on the total mass of the aqueous ink composition. A content (W1) of the first solvent of 6 mass % or more can further firmly fix an image formed on a recording medium. On the other hand, a content (W1) of the first solvent of 4 mass % or less may decrease formation of a coating of the thermoplastic resin particles in the aqueous ink composition to make solidification and fixation of an image insufficient. When the content (W1) of the first solvent is higher than 15 mass %, part of the first solvent remaining on the surface of a recording medium is hardly evaporated and scattered, which may cause insufficient drying of the image.

The second solvent composed of at least one selected from 1,2-hexanediol and 1,2-pentanediol is a solvent having a low surface tension that has a function of further increasing wettability of the aqueous ink composition to a recording medium by the synergistic effect with the surfactant to let the ink uniformly wet the surface of a recording medium. Herein, the solvent having a low surface tension refers to a solvent having a surface tension of 40 mN/m or less at room temperature. By that the ink uniformly wets the surface of a recording medium, unevenness in ink density and bleeding of the ink on the recording medium can be reduced.

Preferred examples of the second solvent include 1,2-alkanediols having 5 to 6 carbon atoms and a boiling point of 210 to 250° C. Since these materials are excellent in a function of letting the ink uniformly wet the non-absorptive plastic surface of a recording medium, bleeding of the formed image can be reduced. However, 1,2-alkanediols having 4 or less carbon atoms are poor in wettability of ink to plastic recording media and may cause unevenness in ink density or bleeding, and 1,2-alkanediols having 7 or more carbon atoms make water solubility of the solvent poor, which may not allow to add the solvent in an amount necessary for ensuring wettability or may prevent storage stability of the ink composition.

The content (W2) of the second solvent is 3 mass % or more and 8 mass % or less based on the total mass of the aqueous ink composition. The content (W2) of the second solvent is preferably 3 mass % or more and 6 mass % or less based on the total mass of the aqueous ink composition. When the content (W2) of the second solvent is 6 mass % or less, an image on a recording medium can be more quickly dried. However, when the content (W2) of the second solvent is less than 3 mass %, wettability of the ink to the polyvinyl chloride recording medium is poor, and a high-quality image may not be given. When the content (W2) of the second solvent is higher than 8 mass %, the solvent is hardly evaporated and scattered, which may cause insufficient drying of the image.

The total content (W1+W2) of the first solvent and the second solvent is 18 mass % or less, based on the total mass of the aqueous ink composition. If the total content (W1+W2) of the solvents is higher than 18 mass %, the solvents are not sufficiently evaporated in the heating step for drying the recording medium and remain, resulting in a decrease in quick-drying property of the image.

Since the third solvent composed of at least one selected from glycol diethers having a boiling point of 150 to 220° C. is selected so as to have a boiling point lower than those of the first solvent and the second solvent and is contained in the aqueous ink composition for ink jet recording, the third solvent is evaporated at the initial stage of the heat step to accelerate the drying of the ink on a recording medium. A high quick-drying property of the ink can reduce the time for heat drying and the temperature for heating and also reduce unevenness and bleeding due to aggregation of ink to improve image quality. The third solvent composed of at least one selected from glycol diethers further has effects of slowly dissolving or swelling the polyvinyl chloride being the recording medium and fixing the solidified material having a main component of the coloring agent, which is a nonvolatile component in the ink composition, to the dissolved portion of the polyvinyl chloride film being the recording medium or letting the solidified material infiltrate gaps generated by the swelling, in the period from the adhesion of ink to the polyvinyl chloride film as the recording medium until the evaporation of the solvent.

Dissolution of polyvinyl chloride in a glycol diether can be judged by the following method: A polyvinyl chloride sheet (Takiron plate, manufactured by Takiron Co., Ltd.) having a thickness of 1.0 mm is immersed in a glycol diether solvent and is left to stand at room temperature for one hour. Then, the sheet is taken out from the solvent, washed with water, and dried, and conditions of the sheet are observed. If no change in the conditions is observed, it is judged that there is no dissolution. If whitening, cracking, softening, swelling, or leaching is observed in the sheet, the sheet is further subjected to the following adhesion test: Glycol diether (0.01 g) is dropped onto the recording surface of a strip-like recording medium sheet, and another strip-like recording medium sheet is placed on the sheet so that both the recording surfaces oppose with the dropped glycol diether therebetween. A load of 300 g is applied onto the two recording medium sheets, and they are left to stand for 10 minutes. Then, each strip-like sheet is subjected to a tensile test at a load of 100 g in the direction shown in the test method for tensile shearing adhesive strength of adhesives (JIS K6850) for investigating adhesiveness. The solvent showing adhesiveness can be judged to dissolve polyvinyl chloride.

Examples of the glycol diether having a polyvinyl chloride-dissolving property judged by the above-mentioned method and having a boiling point in the range of 150 to 220° C. include diethylene glycol dimethyl ether, diethylene glycol diethyl ether, diethylene glycol ethyl methyl ether, diethylene glycol butyl methyl ether, and triethylene glycol dimethyl ether. Among these glycol diethers, particularly preferred are diethylene glycol diethyl ether and triethylene glycol dimethyl ether, which have boiling points of 190 to 220° C.

The content (W3) of the third solvent is 4 mass % or more and 20 mass % or less based on the total mass of the aqueous ink composition. The content (W3) of the third solvent is more preferably 5 mass % or more and 15 mass % or less based on the total mass of the aqueous ink composition.

In the case that the content (W1) of the first solvent in the aqueous ink composition is 4 mass % or more, an image formed on the recording medium of a polyvinyl chloride film can have satisfactory abrasion resistance by adjusting the content (W3) of the third solvent to 4 mass % or more. In the case that the content (W1) of the first solvent in the aqueous ink composition is 6 mass % or more, an image formed on the recording medium of a polyvinyl chloride film can have more satisfactory abrasion resistance by adjusting the content (W3) of the third solvent to 5 mass % or more.

In the case that the content (W2) of the second solvent in the aqueous ink composition is 3 mass % or more, a satisfactory high-quality image with less bleeding can be formed on the recording medium of a polyvinyl chloride film by adjusting the content (W3) of the third solvent to 4 mass % or more.

When the content (W3) of the third solvent in the aqueous ink composition is less than 20 mass %, solvent odor that is generated in the heating step of a printed matter can be sufficiently reduced, and the polyvinyl chloride film of the recording medium is not completely dissolved. Thus, only an effect of allowing the solidified material formed by the ink to adhere to or infiltrate the recording medium can be obtained.

When the content (W3) of the third solvent in the aqueous ink composition is 15 mass % or less, solvent odor that is generated in the heating step can be further reduced. However, when the content (W3) of the third solvent in the aqueous ink composition is higher than 20 mass %, since the surface of the recording medium of polyvinyl chloride is excessively dissolved, defects such as deformation of the recorded matter or generation of wrinkles occur. In addition, when the content (W3) of the third solvent in the aqueous ink composition is higher than 20 mass %, since the solvent volatilizes in a short time during the heating step to increase solvent odor, it is unfavorable.

1.2.2 Coloring Agent

The aqueous ink composition used in the ink jet recording process according to the embodiment contains a water-insoluble coloring agent. Examples of the water-insoluble coloring agent include water-insoluble dyes and pigments, but pigments are preferred. Pigments are not only insoluble or hardly soluble in water but also have a property of being hardly faded by light, gas, and so on. Therefore, the recorded matter printed by the ink composition containing a pigment is excellent in, for example, water resistance, gas resistance, and light resistance and has satisfactory storage stability.

The aqueous ink composition can contain any pigment that has been used in known ink jet recording ink compositions. Examples of the pigment include organic pigments and inorganic pigments that have been used in known ink jet recording ink compositions.

Examples of the inorganic pigment that can be used include titanium oxide, iron oxide, and carbon black produced by a known method such as a contact method, a furnace method, or a thermal method.

Examples of the organic pigment that can be used include azo pigments (e.g., azo lake, insoluble azo pigments, condensed azo pigments, and chelate azo pigments), polycyclic pigments (e.g., phthalocyanine pigments, perylene pigments, perynone pigments, anthraquinone pigments, quinacridone pigments, dioxadine pigments, thioindigo pigments, isoindolinone pigments, and quinophthalone pigments), dye chelates (e.g., basic dye-type chelates and acid dye-type chelates), nitro pigments, nitroso pigments, and aniline black. Among these pigments, those having high affinity to water are preferably used.

More specifically, examples of the pigment for black ink include carbon blacks (C.I. pigment black 7) such as furnace black, lamp black, acetylene black, and channel black; metals such as copper oxide, iron oxide (C.I. pigment black 11), and titanium oxide; and organic pigments such as aniline black (C.I. pigment black 1).

Preferred examples of carbon black include carbon black manufactured by Mitsubishi Chemical Corporation, such as No. 2300, 900, MCF88, No. 20B, No. 33, No. 40, No. 45, No. 52, MA7, MA8, MA100, and No. 2200B; carbon black manufactured by Degussa Co., such as Color Black FW1, FW2, FW2V, FW18, FW200, S150, 5160, and S170, Printex 35, U, V, and 140U, and Special Black 6, 5, 4A, 4, and 25; carbon black manufactured by Columbia Chemical Company, such as Conductex SC and Raven 1255, 5750, 5250, 5000, 3500, 1255, and 700; and carbon black manufactured by Cabot Co., such as Regal 400R, 330R, and 660R, Mogul L, Monarch 700, 800, 880, 900, 1000, 1100, 1300, and 400, and Elftex 12.

Examples of pigments that can be used for color inks include C.I. pigment yellow 1 (fast yellow G), 3, 12 (disazo yellow AAA), 13, 14, 17, 23, 24, 34, 35, 37, 42 (yellow iron oxide), 53, 55, 74, 81, 83 (disazo yellow HR), 95, 97, 98, 100, 101, 104, 108, 109, 110, 117, 120, 138, 150, 151, 154, 155, 180, 185, and 213; C.I. pigment red 1, 2, 3, 5, 17, 22 (brilliant fast scarlet), 23, 31, 38, 48:2 (permanent red 2B(Ba)), 48:2 (permanent red 2B(Ca)), 48:3 (permanent red 2B(Sr)), 48:4 (permanent red 2B(Mn)), 49:1, 52:2, 53:1, 57:1 (brilliant carmine 6B), 60:1, 63:1, 63:2, 64:1, 81 (rhodamine 6G lake), 83, 88, 92, 101 (iron oxide red), 104, 105, 106, 108 (cadmium red), 112, 114, 122 (quinacridone magenta), 123, 146, 149, 166, 168, 170, and 172; C.I. pigment violet 1 (rhodamine lake), 3, 5:1, 16, 19 (quinacridone red), 23, and 38; and C.I. pigment blue 1, 2, 15 (phthalocyanine blue R), 15:1, 15:2, 15:3 (phthalocyanine blue G), 15:4, 15:6 (phthalocyanine blue E), 16, 17:1, 56, 60, and 63.

The particle diameter of the pigment is not particularly limited, but the average article diameter is preferably 25 μm or less and more preferably 2 μm or less. By using a pigment having an average particle diameter of 25 μm or less, clogging can be prevented from occurring, and further sufficient discharge stability can be realized.

The content of the pigment is preferably 0.5 to 15 mass %, more preferably 1.0 to 10.0 mass %, based on the total mass of the ink composition.

The above-mentioned pigment may be subjected to various methods so that the pigment is more easily dispersed and stably held in the aqueous ink composition. Examples of the method include a method of conducting dispersion using a water-soluble resin, a method of conducting dispersion using a surfactant, and a method of providing dispersion and/or dissolution ability by chemically/physically introducing a hydrophilic functional group to the pigment particle surface. The aqueous ink composition that is used in the printing process according to the embodiment can be subjected to any method mentioned above or to a combination of the methods as needed. In particular, in the method where the pigment is dispersed in an aqueous ink by means of a water-soluble resin, adhesiveness between a recording medium and the ink composition and/or adhesiveness among solidified materials in the ink composition may be advantageously increased, at the time when the aqueous ink recorded matter has adhered to a recording medium.

Examples of the water-soluble resin that can be used for dispersing the pigment include polyvinyl alcohols, polyvinyl pyrrolidones, polyacrylic acid, acrylic acid-acrylnitrile copolymers, vinyl acetate-acrylic acid ester copolymers, acrylic acid-acrylic acid ester copolymers, styrene-acrylic acid copolymers, styrene-methacrylic acid copolymers, styrene-methacrylic acid-acrylic acid ester copolymers, styrene-α-methylstyrene-acrylic acid copolymers, styrene-α-methylstyrene-acrylic acid-acrylic acid ester copolymers, styrene-maleic acid copolymers, styrene-anhydrous maleic acid copolymers, vinyl naphthalene-acrylic acid copolymers, vinyl naphthalene-maleic acid copolymers, vinyl acetate-maleic acid ester copolymers, vinyl acetate-crotonic acid copolymers, vinyl acetate-acrylic acid copolymers, and salts thereof. Among them, particularly preferred are copolymers of monomers having hydrophobic functional groups and monomers having hydrophilic functional groups and polymers of monomers having both hydrophobic functional groups and hydrophilic functional groups. The form of the copolymers may be any of random copolymers, block copolymers, alternating copolymers, and graft copolymers.

The salts are, for example, salts with basic compounds such as ammonia, ethylamine, diethylamine, triethylamine, propylamine, isopropylamine, dipropylamine, butylamine, isobutylamine, diethanolamine, triethanolamine, tri-iso-propanolamine, aminomethyl propanol, and morpholine. The addition amount of the basic compound is not particularly limited as long as it is not lower than neutralization equivalent of the water-soluble resin.

The molecular weight of the water-soluble resin that can be used for dispersing the pigment is preferably in the range of 1000 to 100000, more preferably in the range of 3000 to 10000, as a weight-average molecular weight. When the molecular weight is within this range, the coloring agent can be stably dispersed in water, and, for example, viscosity control in the application to the aqueous ink composition is easy. The acid number is preferably in the range of 50 to 300 and more preferably in the range of 70 to 150. When the acid number is within this range, stable dispersion of the coloring agent particles in water can be ensured, and printing using an aqueous ink composition containing this can provide a printed matter having high water resistance.

The above-described water-soluble resin that can be used for dispersing the pigment may be commercially available one. Specific examples thereof include Joncryl 67 (weight-average molecular weight: 12500, acid number: 213), Joncryl 678 (weight-average molecular weight: 8500, acid number: 215), Joncryl 586 (weight-average molecular weight: 4600, acid number: 108), Joncryl 611 (weight-average molecular weight: 8100, acid number: 53), Joncryl 680 (weight-average molecular weight: 4900, acid number: 215), Joncryl 682 (weight-average molecular weight: 1700, acid number: 238), Joncryl 683 (weight-average molecular weight: 8000, acid number: 160), and Joncryl 690 (weight-average molecular weight: 16500, acid number: 240) (the mentioned above are trade names, manufactured by BASF Japan Corp.).

Examples of the surfactant that can be used for dispersing the pigment include anionic surfactants such as alkanesulfonates, α-olefin sulfonates, alkylbenzene sulfonates, alkylnaphthalene sulfonates, acrylmethyl taurates, dialkyl sulfosuccinates, alkyl sulfate salts, sulfated olefin, polyoxyethylene alkyl ether sulfate salts, alkyl phosphate salts, polyoxyethylene alkyl ether phosphate salts, and monoglyceride phosphate salts; amphoteric surfactants such as alkylpyridium salts, alkyl amino acid salts, and alkyl dimethyl betaine; and nonionic surfactants such as polyoxyethylene alkyl ether, polyoxyethylene alkyl phenylether, polyoxyethylene alkyl ester, polyoxyethylene alkyl amide, glycerin alkyl ester, and sorbitane alkyl ester.

The amount of the water-soluble resin or the surfactant that can be used for dispersing the pigment is preferably 1 to 100 mass %, more preferably 5 to 50 mass %, based on 1 mass % of the pigment. In this range, dispersion stability of the pigment in water can be ensured.

Examples of the method of providing dispersion and/or dissolution ability by chemically/physically introducing a hydrophilic functional group to the pigment particle surface include a method of introducing a hydrophilic functional group, for example, —OM, —COOM, —CO—, —SO$_3$M, —SO$_2$NH$_2$, —RSO$_2$M, —PO$_3$HM, —PO$_3$M$_2$, —SO$_2$NHCOR, —NH$_3$, or —NR$_3$ (in the formulae, M denotes a hydrogen atoms, an alkali metal, ammonium, or organic ammonium; and R denotes an alkyl group having 1 to 12 carbon atoms, a phenyl group optionally having a substituent, or a naphthyl group optionally having a substituent) to the pigment. The functional group is physically and/or chemically introduced onto the pigment particle surface by grafting directly and/or with another group. Examples of a multivalent group include alkylene groups having 1 to 12 carbon atoms, phenylene groups optionally having substituents, and naphthylene groups optionally having substituents.

The above-mentioned surface treatment is more preferably performed by treating the pigment particle surface with a treatment agent containing sulfur so that —$SO_3M$ and/or —$RSO_2M$ (M is a counter ion and denotes a hydrogen ion, an alkali metal ion, an ammonium ion, or an organic ammonium ion) chemically bonds to the surface, that is, the pigment is dispersed in a solvent that does not have an active proton, does not have reactivity with sulfonic acid, and does not or hardly dissolve the pigment and is subsequently subjected to surface treatment so that —$SO_3M$ and/or —$RSO_2M$ chemically bonds to the surface of the particle by means of amidosulfuric acid or a complex of sulfur trioxide and tertiary amine and thereby that the pigment can be dispersed and/or dissolved in water.

The surface treatment for grafting the functional group or its salt to the surface of the pigment particle directly or with the multivalent group can be performed by any of various known surface treatment procedures. Examples of the treatment include a method of hydrophilizing the surface of commercially available oxidized carbon black by further oxidizing it with ozone or sodium hypochlorite solution (e.g., JP-A-7-258578, JP-A-8-3498, JP-A-10-120958, JP-A-10-195331, and 10-237349), a method of treating carbon black with 3-amino-N-alkyl substituted pyridium bromide (e.g., JP-A-10-195360 and JP-A-10-330665), a method of introducing a sulfone group to an organic pigment particle surface with a sulfonating agent by dispersing the organic pigment in a solvent in which the organic pigment is insoluble or hardly soluble (e.g., JP-A-8-283596, JP-A-10-110110, and JP-A-10-110111), a method of introducing a sulfone group or a sulfone amino group to the surface of an organic pigment by treating the organic pigment surface by dispersing the organic pigment in a basic solvent that forms a complex with sulfur trioxide and adding sulfur trioxide therein (e.g., JP-A-10-110114), but the method of producing a surface-treated pigment to be used in the invention is not limited these methods.

One pigment particle may be grafted with one kind of functional group or a plurality of kinds of functional groups. The kind of functional group and its amount to be grafted may be appropriately determined depending on dispersion stability in the ink, color concentration, and the drying property at the front surface of the ink jet head.

The pigment can be dispersed in water by mixing each component, that is, a pigment, water, and a water-soluble resin when the resin is used for dispersing the pigment/a pigment, water, and a surfactant when the surfactant is used for dispersing the pigment/a pigment and water when the pigment is provided with surface treatment, and a water-soluble organic solvent, a neutralizer, and other components, according to need for each case, with a disperser that is commonly used, such as a ball mill, a sand mill, an attritor, a roll mill, an agitator mill, a Henshcel mixer, a colloid mill, an ultrasonic homogenizer, a jet mill, or an angmill. In this case, the dispersion is preferably performed until the particle diameter of the pigment preferably becomes 25 µm or less, more preferably 2 µm or less, as the average diameter as described above for ensuring dispersion stability of the pigment in water.

1.2.3. Thermoplastic Resin Particles

The aqueous ink composition that is used in the ink jet recording process according to the embodiment contains water-insoluble thermoplastic resin particles. The thermoplastic resin particles have a function of solidifying the ink and firmly fixing the solidified ink on a recording medium in the step of heating the recording medium within a temperature range of 40 to 60° C. and drying the aqueous ink composition discharged on the recording medium. By this function, the recorded matter recorded by the aqueous ink composition containing the resin particles has excellent abrasion resistance on a non-ink-absorbing recording medium.

The thermoplastic resin particles may be added to the aqueous ink composition so as to be completely dissolved therein or may be contained in the aqueous ink composition as dispersed particles therein, that is, in an emulsion form or a suspension form. Preferably, the resin particles are contained in the aqueous ink composition that is used in the ink jet recording process according to the embodiment in an emulsion form or a suspension form. Since the viscosity of the aqueous ink composition can be readily adjusted to an appropriate range for the ink jet recording process according to the embodiment by containing the resin particles in the emulsion form or the suspension form.

Examples of the component of the thermoplastic resin particles include homopolymers and copolymers of acrylic acid, acrylic acid ester, methacrylic acid, methacrylic acid ester, acrylonitrile, cyanoacrylate, acrylamide, olefin, styrene, vinyl acetate, vinyl chloride, vinyl alcohol, vinyl ether, vinyl pyrrolidone, vinyl pyridine, vinyl carbazole, vinyl imidazole, and vinylidene chloride; fluorine resins; and natural resins. These copolymers can be used in any of random copolymer, block copolymer, alternating copolymer, and graft copolymer forms. Preferred thermoplastic resin particles are formed of an acrylic resin or a styrene-acrylic acid copolymer resin.

The thermoplastic resin particles may be those obtained by a known method using a known material. For example, those disclosed in JP-B-62-1426, JP-A-3-56573, JP-A-3-79678, JP-A-3-160068, and JP-A-4-18462 may be used. In addition, those commercially available can be used, and example thereof include Microgel E-1002 and Microgel E-5002 (the mentioned above are trade names, manufactured by Nippon Paint Co., Ltd.), Boncoat 4001 and Boncoat 5454 (the mentioned above are trade names, manufactured by Dainippon Ink & Chemicals, Inc.), SAE1014 (the mentioned above is a trade name, manufactured by Nippon Zeon Co., Ltd.), Saibinol SK-200 (the mentioned above is a trade name, manufactured by SAIDEN CHEMICAL INDUSTRY CO., LTD.), Joncryl 7100, Joncryl 390, Joncryl 711, Joncryl 511, Joncryl 7001, Joncryl 632, Joncryl 741, Joncryl 450, Joncryl 840, Joncryl 74J, Joncryl HRC-1645J, Joncryl 734, Joncryl 852, Joncryl 7600, Joncryl 775, Joncryl 537J, Joncryl 1535, Joncryl PDX-7630A, Joncryl 352J, Joncryl 352D, Joncryl PDX-7145, Joncryl 538J, Joncryl 7640, Joncryl 7641, Joncryl 631, Joncryl 790, Joncryl 780, and Joncryl 7610 (the mentioned above are trade names, manufactured by BASF Japan, Inc.).

1.2.4. Surfactant

The aqueous ink composition that is used in the ink jet recording process according to the embodiment contains a surfactant. The surfactant has a function of uniformly spreading the ink not to cause unevenness in ink density and bleeding of the ink on the recording medium.

Preferred examples of the surfactant include silicon-based surfactants. The silicon-based surfactants are preferably polysiloxane compounds such as polyether modified organosiloxane. In addition, those commercially available can be used, and example thereof include YK-306, BYK-307, BYK-333, BYK-341, BYK-345, BYK-346, and BYK-348 (the mentioned above are trade names, manufactured by BYK Chemie Japan, Inc.), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (the mentioned above are trade names, manufactured by Shin-Etsu Chemicals Co., Ltd.).

1.2.5. Water

The aqueous ink composition that is used in the ink jet recording process according to the embodiment contains water. The water is the main medium of the aqueous ink composition and is a component that is evaporated and scattered in the above-described drying step.

The water is preferably water from which ionic impurities are removed as much as possible, such as pure water, e.g., ion-exchange water, ultrafiltration water, reverse osmosis water, or distilled water, or ultrapure water. Use of water that has been sterilized by UV irradiation or addition of hydrogen peroxide can prevent occurrence of molds or bacteria for a long period of time and therefore is preferred.

1.2.6. Other Components

The aqueous ink composition that is used in the ink jet recording process according to the embodiment can further contain, for example, a pH adjuster, an antiseptic/antifungal agent, a corrosion inhibitor, and a chelating agent.

Examples of the pH adjuster include potassium dihydrogen phosphate, disodium hydrogen phosphate, sodium hydroxide, lithium hydroxide, potassium hydroxide, ammonia, diethanolamine, triethanolamine, triisopropanolamine, potassium carbonate, sodium carbonate, and sodium hydrogen carbonate.

Examples of the antiseptic/antifungal agent include sodium benzoate, pentachlorophenol sodium, 2-pyridinethiol-1-oxide sodium, sodium sorbate, sodium dehydroacetate, and 1,2-dibenzoisothiazolin-3-one. Examples of commercial products include Proxel XL2 and Proxel GXL (the above-mentioned are trade names, manufactured by Avecia Inc.) and Denicide CSA and NS-500 W (the above-mentioned are trade names, manufactured by Nagase ChemteX Corp.).

Examples of the corrosion inhibitor include benzotriazole.

Examples of the chelating agent include ethylenediaminetetraacetate and salts thereof (e.g., disodium dihydrogen ethylenediaminetetraacetate).

1.2.7. Physical Properties

The viscosity at 20° C. of the aqueous ink composition that is used in the ink jet recording process according to the embodiment is preferably 2 mPa·s or more and 10 mPa·s or less and more preferably 3 mPa·s or more and 6 mPa·s or less. When the aqueous ink composition has a viscosity at 20° C. within this range, since an appropriate amount of droplets of the aqueous ink composition is discharged from a nozzle to further reduce curved flying and scattering of the droplets, the aqueous ink composition can be suitably applied to an ink jet recording apparatus. The viscosity of the aqueous ink composition can be measured with a vibration viscometer VM-100AL (manufactured by Yamaichi Electric Co., Ltd.) by maintaining the temperature of the aqueous ink composition at 20°.

2. Examples

The invention will be more specifically described with reference to examples, but is not limited thereto.

2.1. Preparation of Aqueous Ink Composition 2.1.1. Preparation of Pigment Dispersion In this Example, an aqueous ink composition containing a water-insoluble pigment as the coloring agent was used. The pigment was dispersed in a water-soluble resin in advance and was added to the aqueous ink composition.

The pigment dispersion was prepared as follows: First, 3.0 parts by mass of a styrene-acrylic acid copolymer (weight-average molecular weight: 25000, acid number: 180) serving as a water-soluble resin was added to 84.4 parts by mass of ion-exchange water containing 0.6 parts by mass of 30% ammonia aqueous solution (neutralizer) and was dissolved therein. To the resulting solution, 12 parts by mass of the following pigment was added, followed by dispersion treatment with zirconia beads for 10 hours. Then, coarse particles and impurities such as foreign particles were removed by centrifugal filtration using a centrifuge, and the concentration of the pigment was adjusted to 12 mass %. The pigments used for producing the pigment dispersions are as follows:

C.I. pigment black 7 (used for black pigment dispersion),
C.I. pigment yellow 74 (used for yellow pigment dispersion),
C.I. pigment red 122 (used for magenta pigment dispersion), and
C.I. pigment blue 15:3 (used for cyan pigment dispersion).

2.2. Preparation of Aqueous Ink Composition and Ink Set

Aqueous ink compositions of four colors, black, yellow, magenta, and cyan, were prepared using the pigment dispersions prepared in "2.1.1. Preparation of pigment dispersion" described above so as to have material compositions shown in Tables 1 and 2 as one ink set, and ink sets, each composed of four colors, having different compositions were prepared for Examples 1 to 16 and Comparative Examples 1 to 9. The aqueous ink compositions were each prepared by placing the above-mentioned pigment dispersion and materials shown in Tables 1 and 2 in a container, stirring and mixing the mixture with magnetic stirrer for 1 hour, and removing coarse particles and impurities such as foreign particles by filtration through a membrane filter having a pore size of 5 μm. Note that the numerical values in Tables 1 and 2 all represent mass % and that the amount of ion-exchange water was adjusted so that the total amount of each aqueous ink composition was 100 mass %.

TABLE 1

| | | Example 1 | Example 2 | Example 3 | Example 4 | Example 5 | Example 6 |
|---|---|---|---|---|---|---|---|
| First solvent | 2-pyrrolidone | 7.0 | 7.0 | 7.0 | 6.0 | 6.0 | 6.0 |
| | 1,3-dimethylimidazolidinone | | | | | | |
| | N,N'-dimethylpropylene urea | | | | | | |
| Second solvent | 1,2-pentanediol | | | | | | |
| | 1,2-hexanediol | 8.0 | 8.0 | 8.0 | 5.0 | 5.0 | 5.0 |
| Third solvent | diethylene glycol diethyl ether | | | | | | |
| | triethylene glycol dimethyl ether | 5.0 | 15.0 | 20.0 | 5.0 | 10.0 | 14.0 |
| Water-insoluble pigment | pigment (solid content) | 4.0 | 4.0 | 4.0 | 4.0 | 4.0 | 4.0 |

TABLE 1-continued

| | | | | | | | |
|---|---|---|---|---|---|---|---|
| Aqueous resin solid (dispersion) | styrene-acrylic acid copolymer | 1.0 | 1.0 | 1.0 | 1.0 | 1.0 | 1.0 |
| Thermoplastic resin particle solid content | styrene-acrylic acid copolymer | 3.0 | 3.0 | 3.0 | 3.0 | 3.0 | 3.0 |
| Silicon-based surfactant | polyether modified siloxane | 0.5 | 0.5 | 0.5 | 0.5 | 0.5 | 0.5 |
| Ion-exchange water | | Balance in an amount to adjust the total to 100 | | | | | |
| Evaluation results | quick drying property / speed of drying | good | good | good | excellent | excellent | excellent |
| | abrasion resistance / presence of wearing | good | excellent | excellent | good | good | excellent |
| | image quality / bleeding | excellent | excellent | excellent | good | good | excellent |

| | | Example 7 | Example 8 | Example 9 | Example 10 | Example 11 | Example 1 |
|---|---|---|---|---|---|---|---|
| First solvent | 2-pyrrolidone | 6.0 | 4.0 | 4.0 | 10.0 | 15.0 | 6.0 |
| | 1,3-dimethylimidazolidinone | | | | | | |
| | N,N'-dimethylpropylene urea | | | | | | |
| Second solvent | 1,2-pentanediol | | | | | | |
| | 1,2-hexanediol | 5.0 | 3.0 | 8.0 | 8.0 | 3.0 | 3.0 |
| Third solvent | diethylene glycol diethyl ether | | | | | | |
| | triethylene glycol dimethyl ether | 15.0 | 4.0 | 5.0 | 4.0 | 4.0 | 15.0 |
| Water-insoluble pigment | pigment (solid content) | 4.0 | 4.0 | 4.0 | 4.0 | 4.0 | 4.0 |
| Aqueous resin solid content (dispersion) | styrene-acrylic acid copolymer | 1.0 | 1.0 | 1.0 | 1.0 | 1.0 | 1.0 |
| Thermoplastic resin particle solid content | styrene-acrylic acid copolymer | 3.0 | 3.0 | 3.0 | 3.0 | 3.0 | 3.0 |
| Silicon-based surfactant | polyether modified siloxane | 0.5 | 0.5 | 0.5 | 0.5 | 0.5 | 0.5 |
| Ion-exchange water | | Balance in an amount to adjust the total to 100 | | | | | |
| Evaluation results | quick drying property / speed of drying | excellent | excellent | good | good | excellent | excellent |
| | abrasion resistance / presence of wearing | excellent | good | good | excellent | excellent | excellent |
| | image quality / bleeding | excellent | good | excellent | excellent | good | excellent |

| | | Example 13 | Example 14 | Example 15 | Example 16 | Example 17 | Example 18 |
|---|---|---|---|---|---|---|---|
| First solvent | 2-pyrrolidone | 6.0 | 7.0 | 8.0 | 9.0 | 15.0 | |
| | 1,3-dimethylimidazolidinone | | | | | | |
| | N,N'-dimethylpropylene urea | | | | | | 4.0 |
| Second solvent | 1,2-pentanediol | | | | | | |
| | 1,2-hexanediol | 6.0 | 6.0 | 6.0 | 3.0 | 3.0 | 8.0 |
| Third solvent | diethylene glycol diethyl ether | | | | | | |
| | triethylene glycol dimethyl ether | 14.0 | 5.0 | 5.0 | 15.0 | 15.0 | 6.0 |
| Water-insoluble pigment | pigment (solid content) | 4.0 | 4.0 | 4.0 | 4.0 | 4.0 | 4.0 |
| Aqueous resin solid (dispersion) | styrene-acrylic acid copolymer | 1.0 | 1.0 | 1.0 | 1.0 | 1.0 | 1.0 |
| Thermoplastic resin particle solid content | styrene-acrylic acid copolymer | 3.0 | 3.0 | 3.0 | 3.0 | 3.0 | 3.0 |
| Silicon-based surfactant | polyether modified siloxane | 0.5 | 0.5 | 0.5 | 0.5 | 0.5 | 0.5 |
| Ion-exchange water | | Balance in an amount to adjust the total to 100 | | | | | |
| Evaluation results | quick drying property / speed of drying | excellent | excellent | excellent | excellent | excellent | good |
| | abrasion resistance / presence of wearing | excellent | excellent | excellent | excellent | excellent | good |
| | image quality / bleeding | excellent | excellent | excellent | excellent | excellent | excellent |

TABLE 1-continued

|  |  | Example 19 | Example 20 | Example 21 | Example 22 | Example 23 |
|---|---|---|---|---|---|---|
| First solvent | 2-pyrrolidone |  |  |  | 8.0 | 4.0 |
|  | 1,3-dimethylimidazolidinone | 4.0 | 12.0 |  |  |  |
|  | N,N'-dimethylpropylene urea |  |  | 9.0 |  |  |
| Second solvent | 1,2-pentanediol |  |  |  |  | 3.0 |
|  | 1,2-hexanediol | 3.0 | 6.0 | 4.0 | 6.0 |  |
| Third solvent | diethylene glycol diethyl ether |  | 6.0 |  | 6.0 |  |
|  | triethylene glycol dimethyl ether | 6.0 |  | 5.0 |  | 5.0 |
| Water-insoluble pigment | pigment (solid content) | 4.0 | 4.0 | 4.0 | 4.0 | 4.0 |
| Aqueous resin solid (dispersion) | styrene-acrylic acid copolymer | 1.0 | 1.0 | 1.0 | 1.0 | 1.0 |
| Thermoplastic resin particle solid content | styrene-acrylic acid copolymer | 3.0 | 3.0 | 3.0 | 3.0 | 3.0 |
| Silicon-based surfactant | polyether modified siloxane | 0.5 | 0.5 | 0.5 | 0.5 | 0.5 |
| Ion-exchange water |  | Balance in an amount to adjust the total to 100 |  |  |  |  |
| Evaluation results | quick drying property / speed of drying | excellent | good | excellent | excellent | excellent |
|  | abrasion resistance / presence of wearing | good | excellent | excellent | excellent | good |
|  | image quality / bleeding | good | excellent | good | excellent | good |

TABLE 2

|  |  | Comparative Example 1 | Comparative Example 2 | Comparative Example 3 | Comparative Example 4 | Comparative Example 5 |
|---|---|---|---|---|---|---|
| First solvent | 2-pyrrolidone | 8.0 | 3.0 | 4.0 | 16.0 | 16.0 |
|  | 1,3-dimethylimidazolidinone |  |  |  |  |  |
|  | N,N'-dimethylpropylene urea |  |  |  |  |  |
| Second solvent | 1,2-pentanediol |  |  |  |  |  |
|  | 1,2-hexanediol | 9.0 | 3.0 | 3.0 | 2.0 | 5.0 |
| Third solvent | diethylene glycol diethyl ether |  |  |  |  |  |
|  | triethylene glycol dimethyl ether | 4.0 | 4.0 | 3.0 | 4.0 | 5.0 |
| Water-insoluble pigment | pigment (solid content) | 4.0 | 4.0 | 4.0 | 4.0 | 4.0 |
| Aqueous resin solid (dispersion) | styrene-acrylic acid copolymer | 1.0 | 1.0 | 1.0 | 1.0 | 1.0 |
| Thermoplastic resin particle solid content | styrene-acrylic acid copolymer | 3.0 | 3.0 | 3.0 | 3.0 | 3.0 |
| Silicon-based surfactant | polyether modified siloxane | 0.5 | 0.5 | 0.5 | 0.5 | 0.5 |
| Ion-exchange water |  | Balance in an amount to adjust the total to 100 |  |  |  |  |
| Evaluation results | quick drying property / speed of drying | poor | excellent | excellent | good | poor |
|  | abrasion resistance / presence of wearing | excellent | poor | poor | excellent | excellent |
|  | image quality / bleeding | excellent | good | poor | poor | good |

|  |  | Comparative Example 6 | Comparative Example 7 | Comparative Example 8 | Comparative Example 9 |
|---|---|---|---|---|---|
| First solvent | 2-pyrrolidone |  |  |  |  |
|  | 1,3-dimethylimidazolidinone | 8.0 | 12.0 | 6.0 | 3.0 |
|  | N,N'-dimethylpropylene urea |  |  |  |  |
| Second solvent | 1,2-pentanediol |  |  |  |  |
|  | 1,2-hexanediol | 2.0 | 8.0 | 3.0 | 8.0 |
| Third solvent | diethylene glycol diethyl ether |  |  | 3.0 | 3.0 |
|  | triethylene glycol dimethyl ether | 20.0 | 4.0 |  |  |
| Water-insoluble pigment | pigment (solid content) | 4.0 | 4.0 | 4.0 | 4.0 |

TABLE 2-continued

| | | | | | | |
|---|---|---|---|---|---|---|
| Aqueous resin solid (dispersion) | styrene-acrylic acid copolymer | | 1.0 | 1.0 | 1.0 | 1.0 |
| Thermoplastic resin particle solid content | styrene-acrylic acid copolymer | | 3.0 | 3.0 | 3.0 | 3.0 |
| Silicon-based surfactant | polyether modified siloxane | | 0.5 | 0.5 | 0.5 | 0.5 |
| Ion-exchange water | | | Balance in an amount to adjust the total to 100 | | | |
| Evaluation results | quick drying property | speed of drying | excellent | poor | excellent | good |
| | abrasion resistance | presence of wearing | excellent | excellent | good | poor |
| | image quality | bleeding | poor | excellent | poor | poor |

In Tables 1 and 2, the surfactant used was a silicon-based surfactant, "BYK-348" (manufactured by BYK Chemie Japan, Inc.).

2.3. Evaluation Test 2.3.1. Evaluation of Quick-Drying Property (1) Formation of Recorded Matter An ink jet printer, PX-G930 (manufactured by Seiko Epson Corporation), was partially remodeled and was equipped with a temperature variable heater at the paper guiding portion so that a recording medium can be heated and the temperature thereof can be controlled during recording of an image.

The cyan inks of Examples 1 to 16 and Comparative Examples 1 to 9 prepared in "2.2. Preparation of aqueous ink composition and ink set" were set to the ink jet printer. As the recording medium, a polyvinyl chloride plastic film, "LLSP EX113" (manufactured by Sakurai Co., Ltd.), was used, and solid patterns were recorded thereon. The solid pattern image was formed at a resolution of 720 dpi in the vertical direction and 720 dpi in the lateral direction and a duty of 50%.

The recorded matter was formed using the ink jet printer by adjusting the heater at the paper guiding portion to warm the recording medium during the recording at 50° C. and leaving to stand the recording medium immediately after the recording in a thermostatic chamber at 50° C. for 1 minute for drying.

(2) Evaluation of Recorded Matter

The recorded matter after the drying was taken out from the thermostatic chamber, and the recorded portion was touched with a finger immediately after the taking out for evaluating quick-drying property of the resulting recorded matter according to the following evaluation criteria:

excellent: there is no adhesion of ink to the finger;

good: the surface of the recorded matter is sticky, but there is no adhesion of the ink to the finger, and the stickiness is acceptable for actual use; and poor: there is adhesion of ink to the finger.

The evaluation results are shown in Tables 1 and 2 as the quick-drying property.

2.3.2. Evaluation of Abrasion Resistance (1) Formation of Recorded Matter

The cyan inks of Examples 1 to 16 and Comparative Examples 1 to 9 prepared in "2.2. Preparation of aqueous ink composition and ink set" were each set to the ink jet printer used in "2.3.1. Evaluation of quick-drying property". As the recording medium, a polyvinyl chloride plastic film, "LLSP EX113" (manufactured by Sakurai Co., Ltd.) was used, and solid patterns were recorded thereon. The solid pattern images were formed at a resolution of 720 dpi in the vertical direction and 720 dpi in the lateral direction and a duty of 60%.

The recorded matter was formed using the ink jet printer by adjusting the heater at the paper guiding portion to warm the recording medium during the recording at 50° C. and leaving to stand the recording medium immediately after the recording in a thermostatic chamber at 50° C. for 1 minute for drying.

(2) Evaluation Method of Recorded Matter

The obtained recorded matter was maintained at 20° C. for 16 hours and, then, was rubbed with an abrader having a white cotton cloth for abrasion 10 times under a load of 500 g with a Gakushin-type rubbing fastness tester AB-301S (manufactured by Tester Sangyo Co., Ltd.). The surface conditions of the image were visually observed and were evaluated by the following criteria:

excellent: there is no scratch after rubbing 10 times, good: there are scratches on the surface after rubbing 10 times, but no scratches expose the backing, and the scratches are acceptable for actual use, and poor: there are scratches exposing the backing after rubbing 10 times.

The evaluation results are shown in Tables 1 and 2 as abrasion resistance.

2.3.3. Evaluation of Image Quality (1) Formation of Recorded Matter

The inks of four colors, black, yellow, magenta, and cyan, of the ink set of each of Examples 1 to 16 and Comparative Examples 1 to 9 prepared in "2.2. Preparation of aqueous ink composition and ink set" were set to the ink jet printer used in "2.3.1. Evaluation of quick-drying property". Solid patterns were each recorded on a polyvinyl chloride plastic film, "LLSP EX113" (manufactured by Sakurai Co., Ltd.), as the recording medium. The solid pattern images were formed at a resolution of 720 dpi in the vertical direction and 720 dpi in the lateral direction and a duty of 100%.

The recorded matter was formed using the ink jet printer by adjusting the heater at the paper guiding portion to warm the recording medium during the recording at 50° C. and leaving to stand the recording medium immediately after the recording in a thermostatic chamber at 50° C. for 1 minute for drying.

(2) Evaluation of the Recorded Matter

The resulting recorded matter was observed for bleeding at the portion where each color is in contact with other colors and evaluated by the following evaluation criteria:

excellent: there is no bleeding between different colors, good: there is a slight curve in some portions where different colors are in contact with each other, but it is not bleeding and, therefore, is not a problem for actual use, and poor: there is bleeding between different colors.

The evaluation results are shown in Tables 1 and 2 as image quality.

The aqueous ink composition of Examples 1 to 16 shown in Table 1 were confirmed from the evaluation results of the quick-drying property to show satisfactory quick drying. The evaluation results of abrasion resistance showed that the surfaces of images recorded on the recording medium of the polyvinyl chloride film are hardly abraded and are therefore excellent in abrasion resistance. Furthermore, the evaluation results of image quality showed that the images recorded on the recording medium of the polyvinyl chloride film did not have bleeding or had merely bleeding that does not cause a problem for actual use.

In the aqueous ink compositions of Examples 12 and 16 having a content (W3) of the third solvent of 15 mass % shown in Table 1, no solvent odor was smelled during the heating printing. On the other hand, in the aqueous ink compositions of Example 13 having a content (W3) of the third solvent of 20 mass % shown in Table 1, slight solvent odor was smelled during the heating printing, but it was a degree that is not a problem for actual use.

In the aqueous ink composition of Comparative Example 1 shown in Table 2, since the content (W2) of the second solvent was higher than 8 mass %, a recorded matter inferior in quick-drying property was formed.

In the aqueous ink composition of Comparative Example 2 shown in Table 2, since the content (W1) of the first solvent was less than 4 mass %, a recorded matter inferior in abrasion resistance was formed.

In the aqueous ink composition of Comparative Example 3 shown in Table 2, since the content (W3) of the third solvent was less than 4 mass %, a recorded matter inferior in abrasion resistance and also having much bleeding and being thus inferior in image quality was formed.

In the aqueous ink composition of Comparative Example 4 shown in Table 2, since the content (W1) of the first solvent was higher than 15 mass % and the content (W2) of the second solvent was less than 3 mass %, a recorded matter inferior in quick-drying property and also having much bleeding and being thus inferior in image quality was formed.

In the aqueous ink composition of Comparative Example 5 shown in Table 2, since the content (W1) of the first solvent was higher than 15 mass %, a recorded matter inferior in quick-drying property was formed.

In the aqueous ink composition of Comparative Example 6 shown in Table 2, since the content (W2) of the second solvent was less than 3 mass %, a recorded matter having much bleeding and being thus inferior in image quality was formed.

In the aqueous ink composition of Comparative Example 7 shown in Table 2, since the total content (W1+W2) of the first solvent and the second solvent was higher than 18 mass %, a recorded matter inferior in quick-drying property was formed.

In the aqueous ink composition of Comparative Example 8 shown in Table 2, since the content (W3) of the third solvent was less than 4 mass %, a recorded matter having much bleeding and being thus inferior in image quality was formed.

In the aqueous ink composition of Comparative Example 9 shown in Table 2, since the content (W1) of the first solvent was less than 4 mass % and the content (W3) of the third solvent was less than 4 mass %, a recorded matter inferior in abrasion resistance and having much bleeding and being thus inferior in image quality was formed.

2.3.4. Evaluation of Heating Temperature

The inks of four colors, black, yellow, magenta, and cyan, of the ink set of Example 10 prepared in "2.2. Preparation of aqueous ink composition and ink set" were set to the ink jet printer used in "2.3.1. Evaluation of quick-drying property".

Solid pattern was recorded on a polyvinyl chloride plastic film, "LLSP EX113" (manufactured by Sakurai Co., Ltd.), as the recording medium. The solid pattern image was formed at a resolution of 720 dpi in the vertical direction and 720 dpi in the lateral direction and a duty of 100%.

A recorded matter was formed using the ink jet printer by adjusting the heater at the paper guiding portion to warm the recording medium during the recording at 40° C. and leaving to stand the recording medium immediately after the recording in a thermostatic chamber at 40° C. for 1 minute for drying. Another recorded matter was formed using the ink jet printer by adjusting the heater at the paper guiding portion to warm the recording medium during the recording at 60° C. and leaving to stand the recording medium immediately after the recording in a thermostatic chamber at 60° C. for 1 minute for drying.

In all the resulting recorded matters, slight curves were generated in part of boundaries between adjacent different colors at both heating temperatures, as in the evaluation results of image quality of Example 10 shown in Table 1, but since they are not bleeding, it was judged there is no problem for practical use.

Furthermore, a printed matter was formed by using the ink jet printer by adjusting the heater at the paper guiding portion to warm the recording medium during the recording at 35° C. and leaving to stand the recording medium immediately after the recording in a thermostatic chamber at 35° C. for 1 minute for drying.

In the resulting recorded matter, bleeding obviously occurred at the boundaries between adjacent different colors, unlike the evaluation results of image quality of Example 10 shown in Table 1.

Furthermore, when the recording medium during recording was heated to 70° C. adjusting the heater at the paper guiding portion using the ink jet printer, the recording medium was softened, which made it difficult to transport the recording medium not to allow normal printing.

The invention is not limited to the above-described embodiments, and various modifications are possible. For example, the invention includes configurations that are substantially the same as those described in the embodiments (for example, a configuration having the same function, method, and result, or a configuration having the same object and effect). The invention includes configurations in which portions not essential in the configurations described in the embodiments are replaced with other. The invention also includes configurations that achieve the same functions and effects or achieve the same objects of those of the configurations described in the embodiments. In addition, the invention includes configurations in which known techniques are added to the configurations described in the embodiments.

What is claimed is:

1. An ink jet recording process comprising:
heating a recording medium of a polyvinyl chloride film to a temperature range of 40 to 60° C. and discharging droplets of an aqueous ink composition with an ink jet recording apparatus; and
heating the recording medium to a temperature range of 40 to 60° C. to dry the aqueous ink composition discharged on the recording medium,
wherein the aqueous ink composition contains:
water;
at least one kind of water-insoluble coloring agent;
water-insoluble thermoplastic resin particles;
a surfactant;

a first solvent composed of at least one selected from 2-pyrrolidone, 1,3-dimethyl-imidazolidinone, and N,N'-dimethylpropylene urea;

a second solvent composed of at least one selected from 1,2-hexanediol and 1,2-pentanediol; and a third solvent composed of at least one selected from glycol diethers having a boiling point of 150 to 220° C., and the content (W1) of the first solvent in the aqueous ink composition is 4 to 15 mass %;

the content (W2) of the second solvent in the aqueous ink composition is 3 to 8 mass %;

the total content (W1+W2) of the first solvent and the second solvent is 18 mass % or less; and the content (W3) of the third solvent in the aqueous ink composition is 4 to 20 mass %.

2. The ink jet recording process according to claim 1, wherein the glycol diethers of the third solvent are at least one selected from the group consisting of diethylene glycol dimethyl ether, diethylene glycol diethyl ether, diethylene glycol ethyl methyl ether, diethylene glycol butyl methyl ether, and triethylene glycol dimethyl ether.

3. The ink jet recording process according to claim 1, wherein the water-insoluble coloring agent is a pigment and is dispersed in the aqueous ink composition with a water-soluble resin.

4. The ink jet recording process according to claim 1, wherein the water-insoluble thermoplastic resin particles are made of an acrylic resin or a styrene-acrylic acid copolymer resin.

5. The ink jet recording process according to claim 1, wherein the surfactant is a silicon-based surfactant.

6. The ink jet recording process according to claim 1, wherein the treatment of heating the recording medium is performed with a heater or warm air.

* * * * *